(12) United States Patent
Ikeda et al.

(10) Patent No.: US 9,183,404 B2
(45) Date of Patent: Nov. 10, 2015

(54) IMAGE SENDING APPARATUS AND AUTHENTICATION METHOD IN IMAGE SENDING APPARATUS

(75) Inventors: Atsushi Ikeda, Tokorozawa (JP); Hiroyuki Amano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 305 days.

(21) Appl. No.: 13/090,986

(22) Filed: Apr. 20, 2011

(65) Prior Publication Data

US 2011/0265144 A1    Oct. 27, 2011

(30) Foreign Application Priority Data

Apr. 26, 2010    (JP) ................................ 2010-101303

(51) Int. Cl.
*G06F 7/04* (2006.01)
*G06F 21/60* (2013.01)
*H04L 29/06* (2006.01)

(52) U.S. Cl.
CPC ........... *G06F 21/608* (2013.01); *H04L 63/0815* (2013.01)

(58) Field of Classification Search
CPC .................................................. H04L 63/0815
USPC .......................................................... 726/3
See application file for complete search history.

(56) References Cited

U.S. PATENT DOCUMENTS

| | | | |
|---|---|---|---|
| 7,690,028 B2 * | 3/2010 | Oomori | 726/9 |
| 2005/0007619 A1 * | 1/2005 | Minato | 358/1.14 |
| 2005/0188226 A1 | 8/2005 | Kasatani | |
| 2009/0195820 A1 | 8/2009 | Sugimoto | |
| 2010/0149570 A1 * | 6/2010 | Kamiya et al. | 358/1.13 |
| 2010/0214600 A1 * | 8/2010 | Yagi | 358/1.15 |
| 2011/0255121 A1 * | 10/2011 | Takeuchi et al. | 358/1.14 |

FOREIGN PATENT DOCUMENTS

| | | |
|---|---|---|
| CN | 101094288 A | 12/2007 |
| CN | 101313565 A | 11/2008 |
| JP | 2003-186849 A | 7/2003 |
| JP | 2005-242521 A | 9/2005 |
| JP | 2009-048552 A | 3/2009 |
| JP | 2009-273028 A | 11/2009 |

OTHER PUBLICATIONS

Grimes, Authenticode, 2009, Retrieved from the Internet <URL: web.archive.org/web/20090428225146/http://technet.microsoft.com/en-us/library/cc750035.aspx>, pp. 1-15 as printed.*

(Continued)

*Primary Examiner* — Michael Chao
(74) *Attorney, Agent, or Firm* — Canon U.S.A., Inc. IP Division

(57) ABSTRACT

An image sending apparatus includes a first authentication unit configured to perform processing for first authentication to authenticate a user, a storage unit configured to store authentication information used when the first authentication unit authenticates the user, a sending unit capable of sending image data by a plurality of kinds of sending methods, a destination setting unit configured to set a destination to which the sending unit sends the image data, a second authentication unit configured to perform processing for second authentication required for the sending unit to send the image data to the destination set by the destination setting unit, and a determination unit configured to determine whether to use the authentication information stored in the storage unit when the second authentication unit performs the processing for the second authentication, based on the sending method by which the sending unit sends the image data to the destination.

18 Claims, 14 Drawing Sheets

(56) References Cited

OTHER PUBLICATIONS

No stated author; Authorized Send; 2008; Canon; Retrieved from the Internet <URL: poeinc.com/storage/canon-brochures/copier_authorized_send_bro_053008.pdf>; pp. 1-6.*

No stated author; Canon Security Solutions for the imageRUNNER series; 2008; Canon; Retrieved from the Internet <URL: usa.canon.com/CUSA/assets/app/pdf/ISG_Security/brochure_security_022008.pdf>; pp. 1-20.*

Shogo Takayama, "Easy DB Application Development", System Integrator, May 1, 2008.

* cited by examiner

FIG.5

5000 CONTEXT

| USERNAME | ikeda |
|---|---|
| PASSWORD | password |
| SERVER | \\192.168.0.1 |
| FOLDER PATH | \home\ikeda |
| ⋮ | ⋮ |

FIG.9A

| [FILE] | | NUMBER OF DESTINATION(S): 0 |
|---|---|---|
| PROTOCOL: | Windows(SMB) ▶ | BROWSE ▶ |
| HOST NAME ▶ | | |
| FOLDER PATH ▶ | | |
| USERNAME ▶ | Ikeda | |
| PASSWORD ▶ | ******** | |
| CANCEL | | OK ↵ |

SYSTEM STATUS/CANCEL ▶

FIG.9B

| [FILE] | | NUMBER OF DESTINATION(S): 0 |
|---|---|---|
| PROTOCOL: | Windows(SMB) ▶ | BROWSE ▶ |
| HOST NAME ▶ | | |
| FOLDER PATH ▶ | | |
| USERNAME ▶ | | |
| PASSWORD ▶ | | |
| CANCEL | | OK ↵ |

SYSTEM STATUS/CANCEL ▶

FIG.10A

| [FILE] | NUMBER OF DESTINATION(S): 0 |
|---|---|
| HOST NAME ▶ | |
| FOLDER PATH ▶ | |
| USERNAME ▶ | Ikeda |
| PASSWORD ▶ | ******** |
| CANCEL | OK ↵ |

SYSTEM STATUS/CANCEL ▶

FIG.10B

| [FILE] | NUMBER OF DESTINATION(S): 0 |
|---|---|
| HOST NAME ▶ | 192.168.0.1 |
| FOLDER PATH ▶ | \home\ikeda |
| USERNAME ▶ | Ikeda |
| PASSWORD ▶ | ******** |
| CANCEL | OK ↵ |

SYSTEM STATUS/CANCEL ▶

FIG.13

13 DESTINATION LIST

| idx | DESTINATION TYPE | DESTINATION TABLE NO. | SERVER | FOLDER PATH | USERNAME | PASSWORD |
|---|---|---|---|---|---|---|
| 1 | DESTINATION TABLE | 001 | — | — | — | — |
| 2 | DESTINATION TABLE | 002 | — | — | — | — |
| 3 | USER'S OWN FOLDER | — | \\192.168.0.1 | \homeikeda | ikeda | password |
| 4 | NEW DESTINATION | — | \\share | \scam | public | public |
| ... | ... | ... | ... | ... | ... | ... |

FIG.14

14 DESTINATION LIST IMMEDIATELY BEFORE ENQUEUEING

| idx | DESTINATION TYPE | DESTINATION TABLE NO. | SERVER | FOLDER PATH | USERNAME | PASSWORD |
|---|---|---|---|---|---|---|
| 1 | DESTINATION TABLE | 001 | — | — | ikeda | password |
| 2 | DESTINATION TABLE | 002 | — | — | ikeda | password |
| 3 | USER'S OWN FOLDER | — | \\192.168.0.1 | \home\ikeda | ikeda | password |
| 4 | NEW DESTINATION | — | \\share | \scam | public | public |
| ... | ... | ... | ... | ... | ... | ... |

IMAGE SENDING APPARATUS AND AUTHENTICATION METHOD IN IMAGE SENDING APPARATUS

BACKGROUND OF THE INVENTION

1. Field of the Invention

The present invention relates to an image sending apparatus requiring authentication for use of the apparatus and a function provided therein, and an authentication method in the image sending apparatus.

2. Description of the Related Art

There is known an image sending apparatus allowing an authenticated user to use a specific function provided in the apparatus such as the send function or the print function. Hereinafter, the term "function authentication" is used to refer to user authentication performed to allow or limit use of a specific function provided in an apparatus.

Further, some image sending apparatuses have the function of sending image data to a network folder (shared folder) with use of the Server Message Block (SMB) protocol or another protocol. When a user uses this function of an image sending apparatus, authentication to access a specified folder may be required of the user, depending on the setting of a file server that offers the network folder.

On the other hand, for example, there is known the Single Sign-On (hereinafter referred to as "SSO") technique used in a personal computer, as a technique for enabling authentication required at a login to use a personal computer, to be automatically inherited to authentication required to access a folder. Use of this technique also enables the device authentication or the function authentication in an image sending apparatus to be inherited to authentication for a specified folder.

Further, even without use of the SSO technique, it is possible to apparently emulate the SSO technique by applying the technique for presetting a username and password used in prior authentication, to a screen of later authentication, as discussed in Japanese Patent Application Laid-Open No. 2003-186849.

In most cases, the SSO technique is interactively used at a personal computer. If a user is successfully authenticated in authentication processing to log in a personal computer but fails to be authenticated in later authentication to access a folder, the personal computer displays an authentication screen prompting the user to enter a username and password at this time. Then, the user can enter a correct username and password to access the folder when the screen is displayed. On the other hand, when performing the send function at an image sending apparatus, first, a user sets destinations and authentication information for each destination, and then later, the personal computer performs authentication processing and send processing for each destination. Therefore, it is highly likely that a user does not stay in front of an image sending apparatus when authentication fails in the send processing that is performed at a later time. Obviously, it is impossible to enter correct authentication information without presence of the user in front of the image sending apparatus.

Further, the above-mentioned application of the technique discussed in Japanese Patent Application Laid-Open No. 2003-186849 requires a display of an authentication screen and presetting of the username and password entered in the prior authentication to the authentication screen each time a destination is specified. If login authentication and authentication to access a certain folder are managed in an integrated fashion, a user should be rather annoyed by the authentication screen appearing every time. Examples of this situation include image sending based on the function authentication performed by a Lightweight Directory Access Protocol (LDAP) server to allow use of the send function, and acquisition of a folder path associated with this authentication from the same LDAP server to use the folder path as a send destination.

Further, it is possible that a folder shared by all users is registered in an address book together with a public username and a password, and a system administrator wants this registered information to be just used as it is for the send authentication when that folder is selected as a send destination. Conversely, another possible situation that, although a shared folder is registered in an address book, a system administrator wants a user to access that folder by using the username specified in the function authentication for the send function. In this way, uniformly setting whether to inherit authentication does not necessarily improve efficiency of user authentication.

SUMMARY OF THE INVENTION

The image sending apparatus according to the present invention provides an image sending apparatus enabling settings about whether to inherit authentication information for image sending and whether to display a screen for inputting authentication information according to a kind of destination or a destination setting method. According to the image sending apparatus of the present invention, it is possible to select settings about whether to inherit authentication information for image sending and whether to display a screen for inputting authentication information according to a kind of destination or a destination setting method.

According to an aspect of the present invention, an image sending apparatus includes a first authentication unit configured to perform processing for first authentication to authenticate a user, a storage unit configured to store authentication information used when the first authentication unit authenticates the user, a sending unit capable of sending image data by a plurality of kinds of sending methods, a destination setting unit configured to set a destination to which the sending unit sends the image data, a second authentication unit configured to perform processing for second authentication required for the sending unit to send the image data to the destination set by the destination setting unit, and a determination unit configured to determine whether to use the authentication information stored in the storage unit when the second authentication unit performs the processing for the second authentication, based on the sending method by which the sending unit sends the image data to the destination. In the image sending apparatus, the second authentication unit selectively performs the processing for the second authentication with use of the authentication information stored in the storage unit, or the processing for the second authentication without use of the authentication information stored in the storage unit, according to the determination made by the determination unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates an example of a context.

FIGS. 9A and 9B illustrate examples of a screen prompting a user to enter a username and a password for sending data to a new destination.

FIGS. 10A and 10B illustrate examples of a screen prompting a user to enter a username and a password for sending data to the user's own folder.

FIG. 13 illustrates an example of a destination list.

FIG. 14 illustrates an example of the destination list after completion of setting of authentication information.

DESCRIPTION OF THE EMBODIMENTS

Various exemplary embodiments, features, and aspects of the invention will be described in detail below with reference to the drawings.

Figure 1:
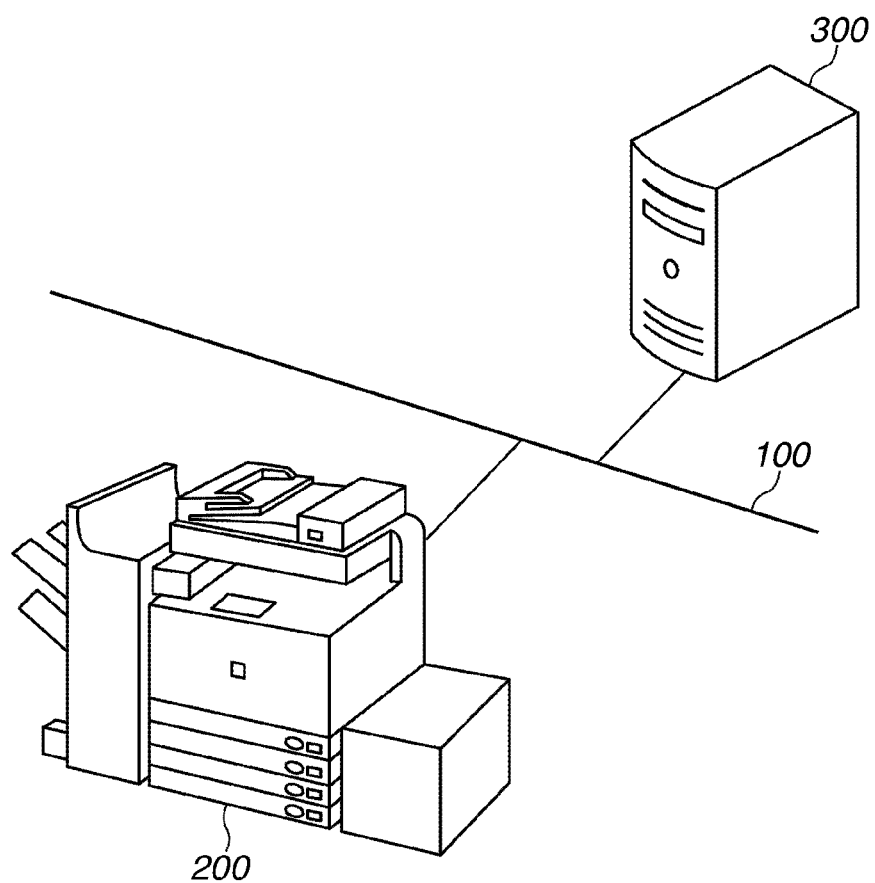
FIG. 1 illustrates an example of a system configuration including an image sending apparatus (multi function peripheral (MFP)).

FIG. 1 illustrates an example of a system configuration including an image sending apparatus (MFP) according to a first exemplary embodiment.

A multi function peripheral (MFP) 200, which is an example of an image sending apparatus, is connected to a Lightweight Directory Access Protocol (LDAP) server 300 via a local area network (LAN) 100. The MFP 200 is a multi-function image processing apparatus provided with multiple functions such as the copy function, the print function, and the image send function. The image send function of the MFP 200 is a function of sending image data obtained by, for example, scanning an original document to a destination. The image send function can send image data by a plurality of kinds of sending methods. The image send function of the MFP 200 according to the present exemplary embodiment can send image data via an electronic mail, a file transfer under SMB, and a file transfer under File Transfer Protocol (FTP), as the kinds of sending methods.

The MFP 200 realizes user authentication when a user uses the send function, which will be described later, by communicating with the LDAP server 300 under a predetermined protocol. This protocol is a known technique, and therefore will not be described in detail herein. The LDAP server 300 is an example of an authentication server. Alternatively, the MFP 200 may be equipped with a user authentication means. In this case, the LDAP server 300 may be omitted.

Figure 2:
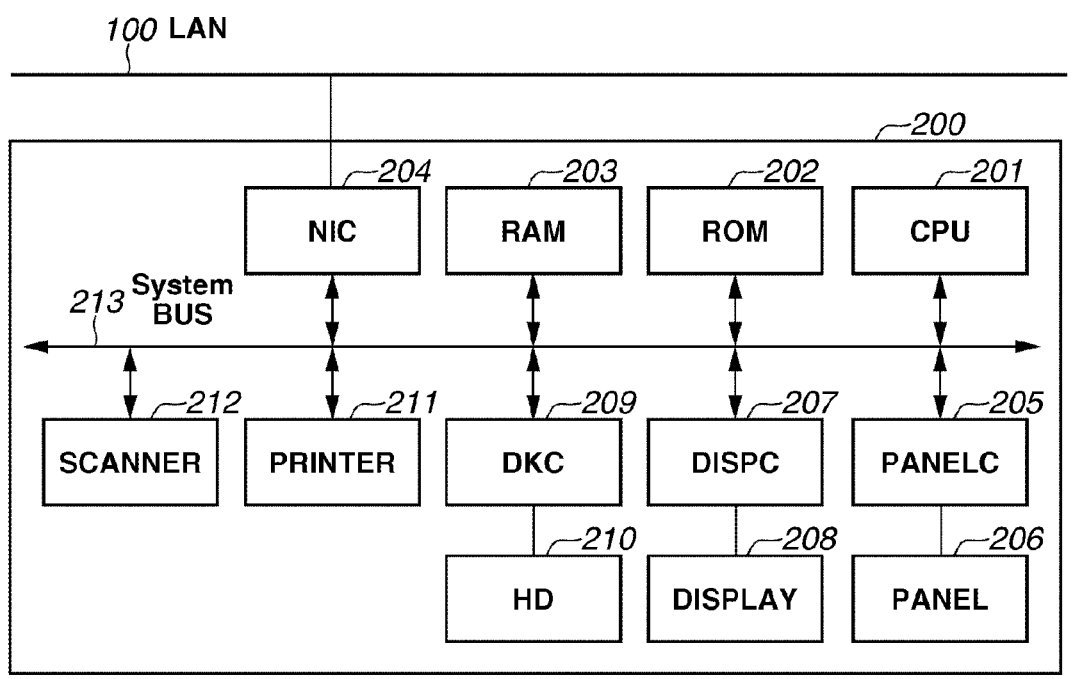
FIG. 2 is a block diagram illustrating an example of a hardware configuration of the MFP.

FIG. 2 is a block diagram illustrating an example of a hardware configuration of the MFP 200.

The MFP 200 includes a central processing unit (CPU) 201, a read only memory (ROM) 202, a random access memory (RAM) 203, a network interface card (NIC) 204, an external input controller (PANELC) 205, and various buttons and a touch panel (PANEL) 206. The MFP 200 further includes a display controller (DISPC) 207, a display (DISPLAY, display unit) 208, a disk controller (DKC) 209, a hard disk (HD) 210, a printer unit (PRINTER) 211, and a scanner unit (SCANNER) 212.

The CPU 201 is in charge of overall control of devices connected to a system bus 213, and execution of firmware modules stored in the ROM 202, or the HD 210 which is a mass storage device. As the firmware modules, there are at least two modules. Updating the firmware modules can be executed individually for each module.

Further, the CPU 201 performs the processing illustrated in the flowcharts that will be described later, based on the firmware modules as the control programs. In some cases, the HD 210 may be also used as a space for temporarily storing an image. The RAM 203 functions as a main memory and a work area of the CPU 201. In the present exemplary embodiment, the single CPU 201 executes various programs, but a plurality of CPUs may execute those programs in collaboration with each other.

The PANELC 205 controls an instruction input from the PANEL 206 provided to the MFP 200. The PANEL 206 includes various kinds of buttons, keys, a touch panel sheet, and the like, and constitutes an operation unit of the MFP 200. A DISPC 207 controls image drawing on the DISPLAY 208. The DISPLAY 208 is constituted by, for example, a liquid crystal display, and displays an operation screen of the MFP 200. The operation unit of the MFP 200 is constituted by the PANEL 206 and the DISPLAY 208.

The NIC 204 is in charge of exchanges of data with another MFP, a file server (not illustrated), or the LDAP server 300 via the LAN 100. The PRINTER 211 forms an image on a recording sheet by the electrophotographic method. The SCANNER 212 reads an image printed on a recording sheet. The SCANNER 212 is equipped with a not-illustrated auto document feeder, and thereby can automatically read a plurality of documents.

The MFP 200 according to the present exemplary embodiment is configured to perform the device authentication and the send authentication. The send authentication is an example of the function authentication. The device authentication is realized by storage of an authentication table containing department IDs and passwords in the HD 210 of the MFP 200, and a check of a department ID and a password input by a user against the table. For the send authentication, the MFP 200 communicates with the LDAP server 300 via the LAN 100 to authenticate a user. In the present exemplary embodiment, a user authenticated by the device authentication is allowed to use the copy function and the print function of the MFP 200. Further, a user authenticated by the send authentication is allowed to use the send function of the MFP 200. In each of the device authentication and the send authentication, if a user does not operate the PANEL 206 for a predetermined time after the user is authenticated (after the user logs in), the authentication status is changed from an authenticated status to a unauthenticated status (logout status). This "predetermined time" is set to the NFP 200 in advance, and a timer (auto-logout timer) in the form of software counts this time. The auto-logout timer may be embodied in the form of hardware. In this case, when the auto-logout timer detects that the predetermined time has passed, an interrupt signal is issued to the CPU 201.

Figure 3:
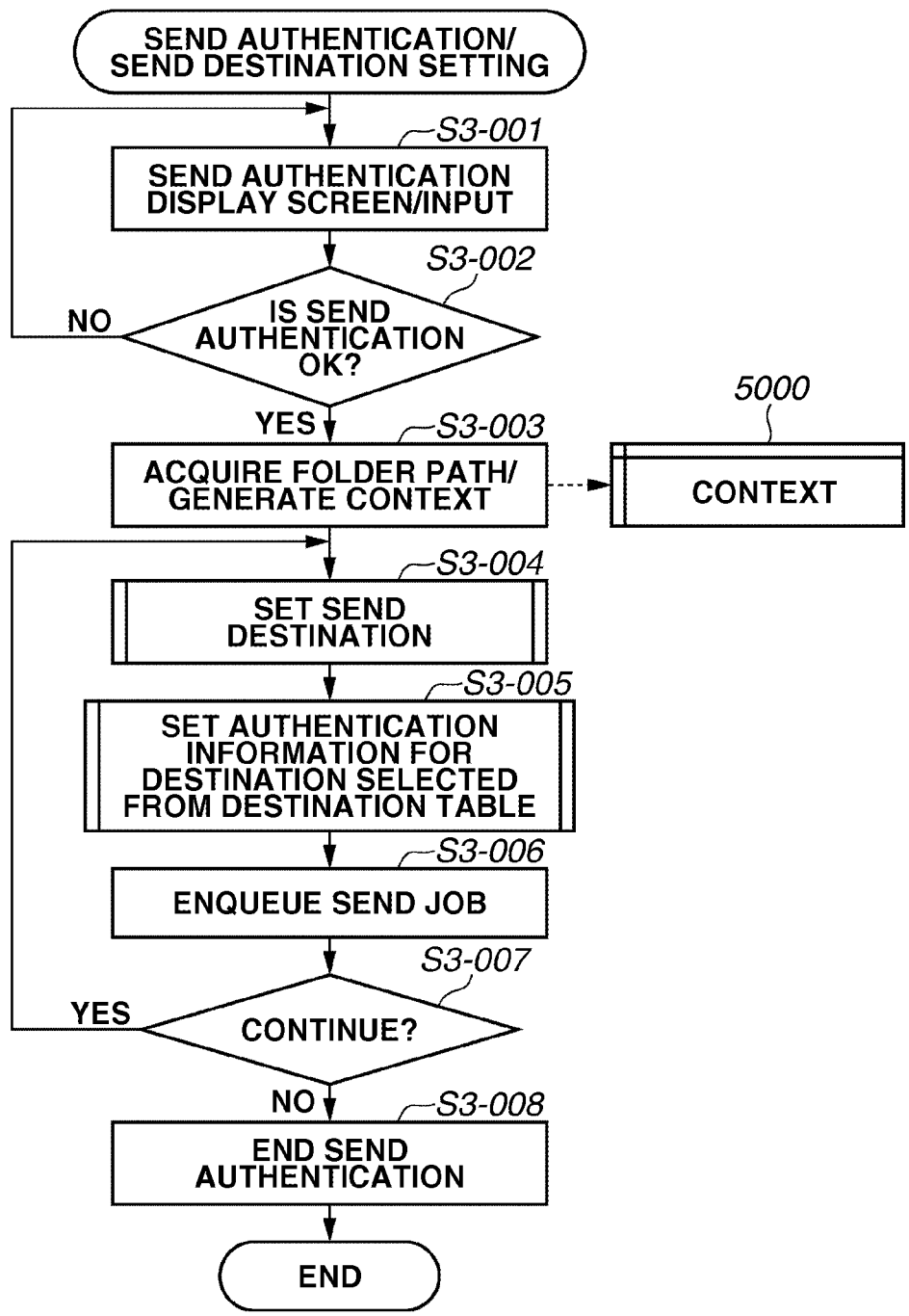
FIG. 3 is a flowchart illustrating an example of send authentication processing and send destination setting processing in a first exemplary embodiment.

FIG. 3 is a flowchart illustrating an example of send authentication processing and send destination selection processing in the present exemplary embodiment.

In the present exemplary embodiment, the term "inherit authentication information" or the more simple term "inherit" is used to refer to utilization of authentication information (context) such as a username (or a user identification (ID)) and a password entered for the send authentication, for other authentication processing that is performed at a later time. In this way, the term "inheritance authentication" is used to refer to use of authentication information used in prior authentication processing, for other authentication processing that is performed at a later time. On the other hand, the term "each-time" is used herein in such a manner that "each-time" display means a display of an input screen for entering authentication information at the time of authentication processing different from the send authentication that is performed after the send authentication to prompt a user to enter authentication information once more. In this regard, in the present exemplary embodiment, the term "each-time authentication" is used to refer to requiring a user to enter authentication information for each authentication processing as mentioned above. The MFP 200 can even employ both the "each-time" method and the "inheritance" method. In this case, the MFP 200 displays a screen for entering authentication information when later authentication processing is performed. Then, the inherited authentication information is set (preset) on this displayed screen as an initial value thereof.

A program required for execution of the send authentication processing and the send destination selection processing illustrated in the flowchart of FIG. 3 is stored in the HD 210 together with the other programs. The program stored in the HD 210 is developed into the RAM 203 when the power source of the MFP 200 is turned on. Then, authentication of a user by the device authentication enables the CPU 201 to carry out the flowchart of FIG. 3. The processing of the flowcharts that will be described later is also developed into the RAM 203 and carried out by the CPU 201 in the same manner.

First, in step S3-001, the CPU 201 displays, on the DISPLAY 208, a screen prompting an input of a username and a password required for the send authentication. Next, the CPU 201 receives the username and the password that the user enters by operating the PANEL 206, and waits a login request for the send authentication. Upon a reception of the login request, the CPU 201 accesses the LDAP server 300 via the LAN 100. More specifically, the CPU 201 requests the authentication by sending the entered username and password to the LDAP server 300 with use of a predetermined protocol. Upon a reception of the request, the LDAP server 300 checks the received username and password, and returns the authentication result to the MFP 200. After the MFP 200 receives the authentication result from the LDAP server 300, the processing proceeds to step S3-002.

In step S3-002, the CPU 201 determines whether the authentication result of the send authentication received from the LDAP server 300 indicates that the user can be successfully authenticated. If the authentication result indicates that the user can be successfully authenticated (YES in step S3-002), the processing proceeds to step S3-003. If not (NO in step S3-002), a send authentication failure is displayed on the DISPLAY 208, and the processing returns to step S3-001.

In step S3-003, the CPU 201 acquires the directory information of the authenticated user from the LDAP server 300. More specifically, the CPU 201 requests a search for the homeDirectory property value of the authenticated user from the LDAP server 300, and acquires the search result. This process enables the CPU 201 to locate the home directory that is a storage area assigned to the authenticated user. After that, the CPU 201 stores the username and the password used in the send authentication, the Internet Protocol (IP) address of the LDAP server 300, the folder path to the home directory, and the like in the RAM 203 as a context 5000 in such a manner that these pieces of data are associated with one another.

FIG. 5 illustrates an example of a context 5000. The context 500 is an example in which a user is authenticated by the LDAP server 300 with use of the username "ikeda" and the password "password". Further, "\home\ikeda" is acquired as the homeDirectory property value. The context 5000 illustrated in FIG. 5 does not contain a server name in the property value. In this case, the IP address of the LDAP server 300 "\\192.168.0.1" is set as the IP address of the server where the home directory exists. This means that, in the example illustrated in FIG. 5, the home directory of the authenticated user exists in the LDAP server 300.

Next, the processing proceeds to step S3-004. In step S3-004, the CPU 201 displays, on the DISPLAY 208, a send operation screen, and buttons for an operation such as setting a reading resolution and switching between one-sided reading and two-sided reading. Then, the CPU 201 receives various kinds of settings for an image sending operation. Further, the CPU 201 receives an operation for setting a send destination. The detailed flow of the send destination setting will be described later.

After completion of the send destination setting, the processing proceeds to step S3-005. If authentication is necessary to access one or more set destinations, the CPU 201 performs the "each time" processing and the "inheritance" processing with respect to the authentication information (context). If the authentication information is inherited, the context 5000, which is obtained by performing the send authentication, is inherited. The details thereof will be described later. When all destinations are established, the processing proceeds to step S3-006.

In step S3-006, the SCANNER 212 reads an original document placed on the SCANNER 212 illustrated in FIG. 2. After completion of the reading, the CPU 201 creates a send job by associating the read data with all of the established destinations, and inputs the send job into a queue for the send processing. Then, the processing proceeds to step S3-007.

In step S3-007, the CPU 201 checks the user's selection about whether the user wants to continue the destination setting processing. If the user selects to continue the destination setting processing (YES in step S3-007), the processing returns to step S3-004. If the user selects to end the destination setting processing to log out from the send authentication (NO in step S3-007), the processing proceeds to step S3-008.

In step S3-008, the CPU 201 discards (ends) the send authentication. More specifically, the CPU 201 deletes the context 5000 that is stored in the RAM 203 in step S3-003. Then, the present flowchart is ended.

Figure 4:
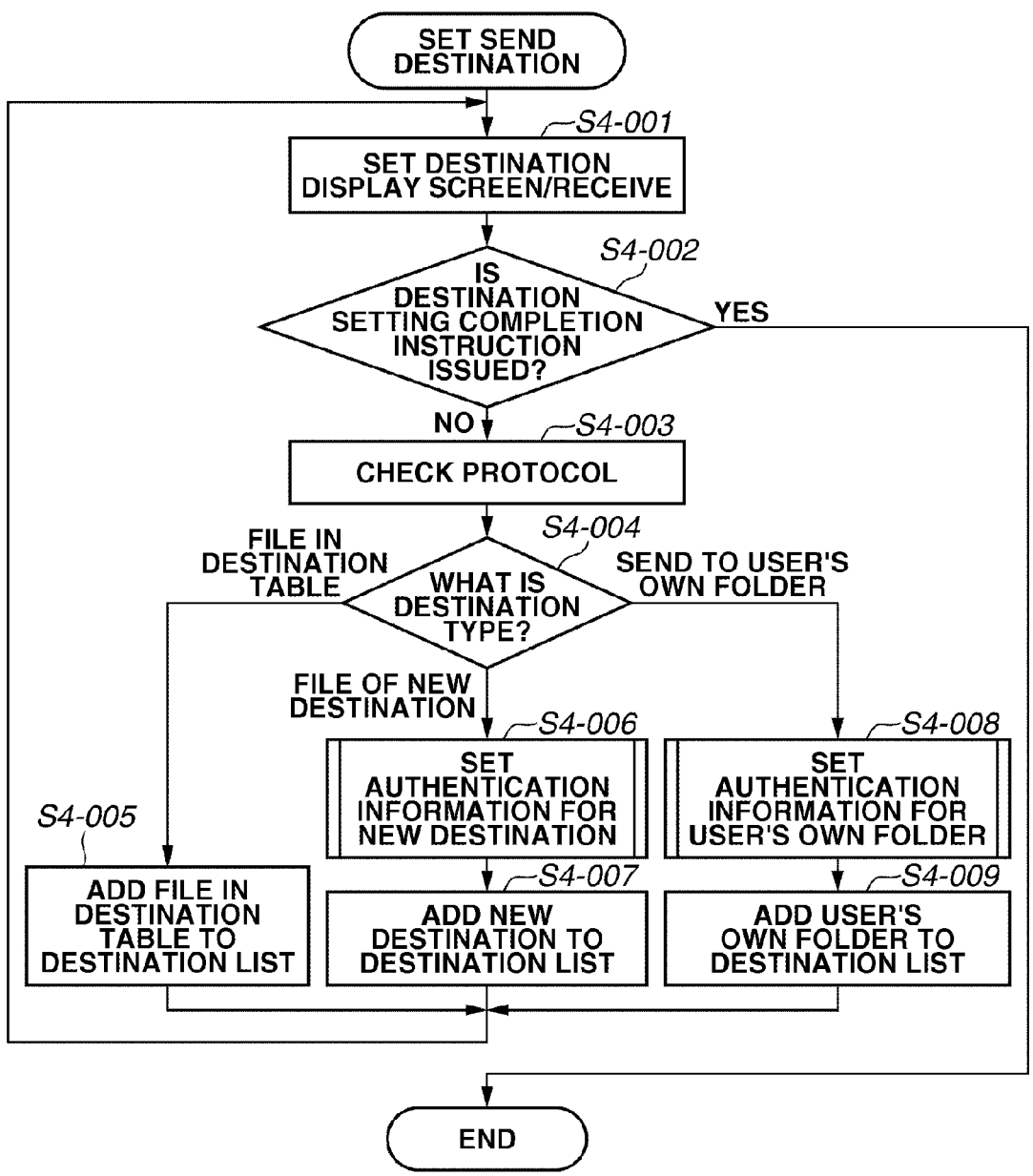
FIG. 4 is a flowchart illustrating an example of the send destination setting processing.

FIG. 4 is a flowchart illustrating an example of the send destination setting processing performed in step S3-004.

In step S4-001, the CPU 201 displays a screen for setting a send destination on the PANEL 206, and receives the user's setting of send destination. At this time, the CPU 201 receives any of an instruction indicating that the user selects a specific destination from destinations displayed in a destination table, an instruction indicating that the user enters a new destination, and an instruction indicating that the user wants to "send data to the user's own folder". Then, the processing proceeds to step S4-002.

In step S4-002, the CPU 201 determines whether one or more destinations are set, and the setting and selection of send destination are completed. If the destination setting is completed (YES in step S4-002), the present flowchart is ended. More specifically, an operation screen for setting the destination is displayed on the PANEL 206, and this operation screen contains a "COMPLETE" button for issuing an instruction to complete a destination setting operation. When the user presses the "COMPLETE" button, the present flowchart is ended.

If not (NO in step S4-002), the processing proceeds to step S4-003.

In step S4-003, the CPU 201 checks the protocol to be used for sending image data to the selected destination. Examples of the protocol include a protocol for a file transfer (SMB, FTP), and an electric mail (Simple Mail Transfer Protocol (SMTP)). If image data is sent to a shared folder as a destination with use of the SMB protocol, authentication may be required in order to access to the folder. Alternatively, if image data is sent to an FTP server as a destination with use of the FTP protocol, authentication may be required in order to access the FTP server. Further alternatively, if an electric mail with image data attached thereto is sent to an electric mail address as a destination, authentication may be required at the SMTP server. The MFP 200 according to the present exemplary embodiment can offer the following two input methods as a method of inputting authentication information (username and password) for authentication required in order to send image data to a destination. One of them is a method of requesting a user to input authentication information each time the user selects a send destination (each-time authentication). The other is a method of using authentication information (context 5000) used in the send authentication (inheritance authentication). The MFP 200 is configured such that a user or an administrator can set an authentication method in advance as to whether to perform the each-time authentication or the inheritance authentication when a user selects a send authentication and is required to undergo authentication. The setting about the authentication method is stored in, for example, the HD 210 as setting information.

Next, the processing proceeds to step S4-004 in which the CPU 201 checks the type of the selected destination.

If the selected destination is a destination registered in the destination table (FILE IN DESTINATION TABLE in step S4-004), the processing proceeds to step S4-005. If the selected destination is a destination that user newly enters (FILE OF NEW DESTINATION in step S4-004), the processing proceeds to step S4-006. If the selected destination is the folder of the user authenticated by the send authentication (SEND DATA TO USER'S OWN FOLDER in step S4-004), the processing proceeds to step S4-008. The destination table (address book) is a table in which send destinations supposed to be used by a user frequently are registered in advance, and is stored in the HD 210. The CPU 201 displays a list of the send destinations registered in the destination table on the DISPLAY 208, and can set the destination that the user specifies from the displayed list as a send destination.

In step S4-005, the CPU 201 adds one or more destinations selected from the destination table to a destination list, and then the processing returns to step S4-001. The details of the destination list will be described later.

In step S4-006, the CPU 201 sets the authentication information required for the authentication for sending image data to the newly specified file destination. The details of the inheritance processing will be described later. Then, the processing proceeds to step S4-007.

In step S4-007, the CPU 201 adds the newly specified file destination to the destination list, and then the processing returns to step S4-001.

Step S4-008 is performed when the user decides in step S4-004 to send data to the user (which means "me" for this user) authenticated by the send authentication. The destination of the user authenticated by the send authentication is the folder of the home folder which is set to the user authenticated by the send authentication based on the directory information contained in the context 5000 acquired from the LDAP server 300. Therefore, the image data is sent to the home folder. In step S4-008, the CPU 201 sets the authentication information to access this home folder. Then, the processing proceeds to step S4-009.

In step S4-009, the CPU 201 adds the destination of the authenticated user (the home folder of this user) to the destination list, and the processing returns to step S4-001.

The destination of the authenticated user is not limited to the home folder of the user, and may be another type of destination information such as the electric mail address of the user.

Figure 6:
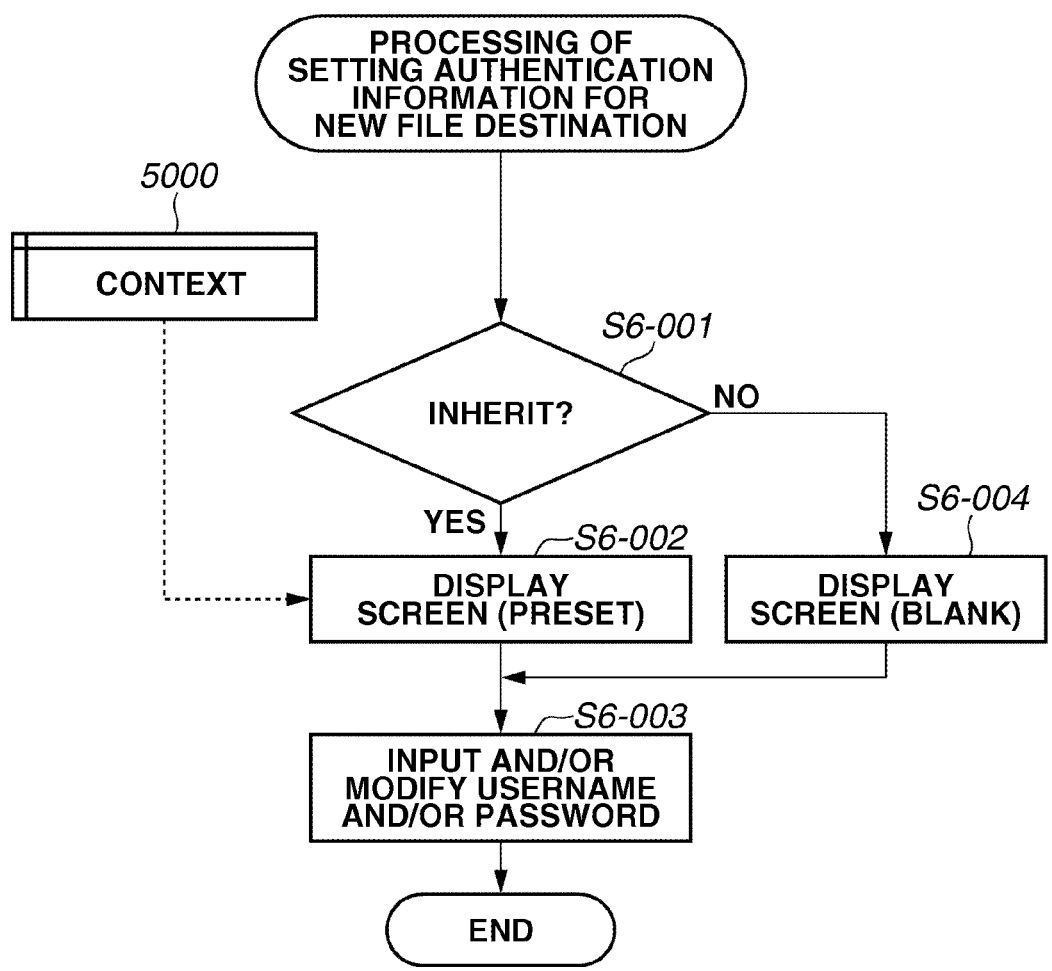
FIG. 6 is a flowchart illustrating an example of processing of setting authentication information for a new file destination.

FIG. 6 is a flowchart illustrating an example of the processing of setting authentication information for a new file destination performed in step S4-006 illustrated in FIG. 4.

In step S6-001, the CPU 201 checks the setting of the authentication method applied to a new destination by referring to the authentication setting information stored in the HD 210. The details of the authentication setting information will be described later. If the setting is to inherit the authentication information for a new destination (YES in step S6-001), the processing proceeds to step S6-002, and if not (NO in step S6-001), the processing proceeds to step S6-004.

In step S6-002, the CPU 201 displays a screen prompting the user to enter authentication information such as a username and a password on the DISPLAY 208. Then, the CPU 201 presets the username and the password stored in the context 5000 into the input fields of username and password.

FIG. 9A illustrates an example of the screen displayed on the DISPLAY 208 in step S6-002. FIGS. 9A and 9B illustrate examples of the screen on which a shared folder under, for example, the SMB protocol, is set as a send destination. The destination is specified by the items "HOST NAME" and "FOLDER PATH" illustrated in FIGS. 9A and 9B, to which, in the examples illustrated in FIGS. 9A and 9B, the user is supposed to enter a new destination through a manual operation. On the screen illustrated in FIG. 9A, the items "USERNAME" and "PASSWORD" are inherited from the context 5000 illustrated in FIG. 5 and preset. In the "PASSWORD" field on the screen, the true password stored in context 5000 is replaced with dummy characters (for example, the character "*"), but actually, internal processing presets the true password stored in the context 5000. When the authentication to access the folder set as a new destination requires the same authentication information as the authentication information for the send authentication, user's operation of setting the authentication information can be simplified by presetting the authentication information used in the send authentication as illustrated in FIG. 9A.

On the other hand, in step S6-004, the CPU 201 displays, on the DISPLAY 208, a screen prompting the user to enter the authentication information such as a username and a password. In this case, since the authentication information is not inherited, the displayed screen contains blank "USERNAME" and "PASSWORD" input fields as illustrated in FIG. 9B. In this case, the user has to enter data to the respective input fields through a manual operation. When the authentication to access the folder set as a new destination requires authentication information different from the authentication information for the send authentication, the authentication information for the send authentication does not have to be preset.

In step S6-003, the CPU 201 receives the user's input and/or modifications of host name, folder path, username, and/or password. When input completion is notified by pressing of an OK button on the screen illustrated in FIGS. 9A and 9B, the present flowchart is ended.

Figure 7:
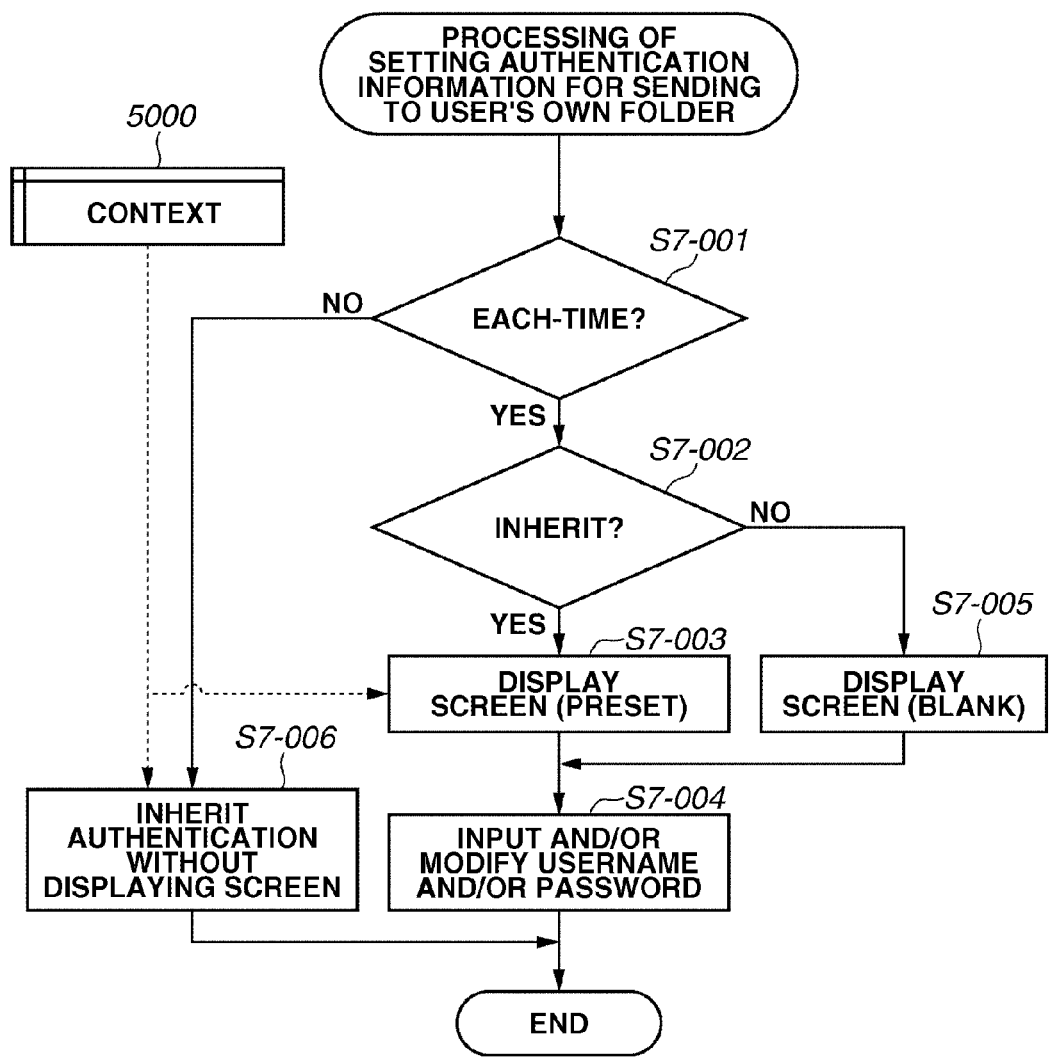
FIG. 7 is a flowchart illustrating an example of processing of setting authentication information to send data to user's own folder.

FIG. 7 is a flowchart illustrating an example of the processing of setting authentication information for sending data to user's own folder performed in step S4-008 in FIG. 4.

In steps S7-001 and S7-002, the CPU 201 checks the setting of the authentication method for sending data to user's own folder by referring to the authentication setting information stored in the HD 210. First, the CPU 201 checks in step S7-001 whether the each-time authentication is supposed to be performed. If the setting of performing the each-time authentication is selected for sending data to user's own folder (YES in step S7-001), the processing proceeds to step S7-002, and if not (NO in step S7-001), the processing proceeds to step S7-006.

In step S7-002, the CPU 201 checks the setting about whether to perform "inheritance" of the authentication information. If the setting of inheriting the authentication information is selected for sending data to user's own folder (YES in step S7-002), the processing proceeds to step S7-003, and if not (NO in step S7-002), the processing proceeds to step S7-005.

In step S7-003, the CPU 201 displays a screen prompting the user to enter a username and a password on the DISPLAY 208. The username and password stored in the context 5000 are preset to the username and password input fields.

FIG. 10A illustrates an example of the screen displayed in step S7-003. On the screen illustrated in FIG. 10A, the inherited username and password in the context 5000 are input in the username and password input fields as initial values. In the password field on the screen, the true password stored in context 5000 is replaced with dummy characters (for example, the character "*"), but actually, internal processing presets the true password in the context 5000. On the screen illustrated in FIG. 10A, the input fields for the host name and folder path specifying the send destination are displayed in gray, which indicates that these fields are not to be filled and cannot be edited. As internal processing, the values of server and folder path stored in the context 5000 illustrated in FIG. 5 are used as the host name and the folder path.

FIG. 10B illustrates another example of the screen displayed in step S7-003. The screen illustrated in FIG. 10B is the same as the screen illustrated in FIG. 10A, except for the host name and folder path input fields of FIG. 10B that are respectively filled with the values of server name and folder path stored in the context 5000, and are displayed in gray indicating that these fields cannot be edited.

On the other hand, in step S7-005, the CPU 201 displays a screen prompting the user to enter a username and a password on the DISPLAY 208. In this case, since the authentication information is not inherited from the send authentication, the CPU 201 displays the same screen as the screen illustrated in FIG. 10A, except that the screen this time contains blank username and password input fields. Then, the processing proceeds to step S7-004.

In step S7-004, the CPU 201 receives the user's input and/or modifications of the username and/or password. Then, when input completion is notified by pressing of the OK button illustrated in FIGS. 10A and 10B, the present flowchart is ended.

If the CPU 201 determines in step S7-001 that the setting of not displaying the each-time screen is selected for sending data to user's own folder (NO in step S7-001), the processing proceeds to step S7-006. In step S7-006, without displaying a screen such as the ones illustrated in FIGS. 10A and 10B, the send destination and the authentication information are set by inheriting the server, the folder path, the username, and the password stored in the context 5000 illustrated in FIG. 5.

FIG. 13 illustrates an example of the destination list. The destination list 13 is a list storing destinations that are each determined as a send destination in image sending performed by the MFP 200. A destination is added to the destination list 13 in steps S4-005, S4-007, and S4-009 illustrated in FIG. 4. FIG. 13 illustrates, by way of example, the destination list 13 in which the destinations of Nos. 001 and 002 in the destination table are added to idx 1 and 2 in step S4-005. Further, this destination list 13 indicates that a new destination having the network folder path "\\share\scan" is added to idx 4 in step S4-007. Further, this destination list 13 indicates that the destination for sending a file to the user's own folder is added to idx 3 based on the data in the context 5000 illustrated in FIG. 5 in step S4-009.

Figure 8:
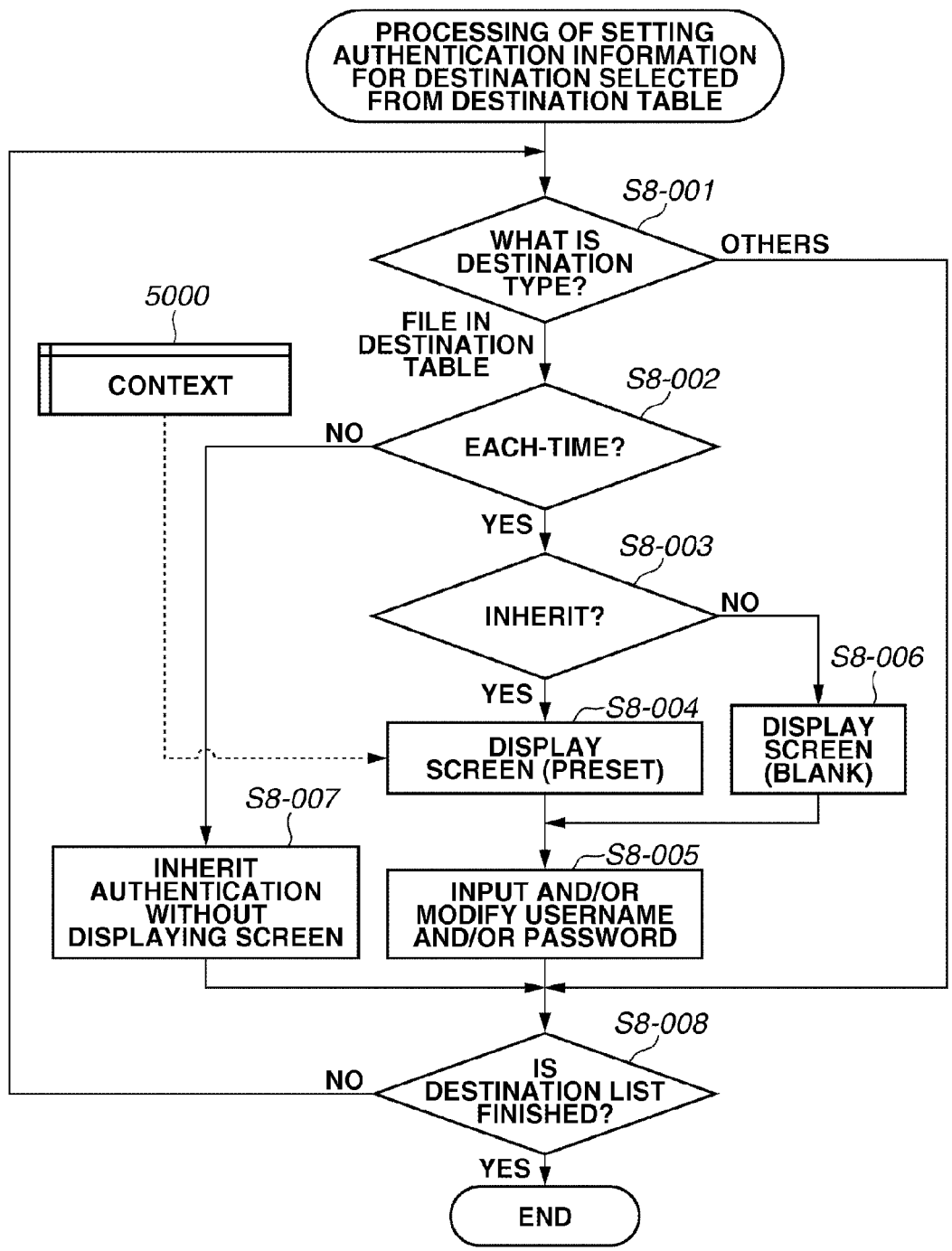
FIG. 8 is a flowchart illustrating each-time processing and inheritance processing for a file destination in a destination table.

FIG. 8 is a flowchart illustrating an example of the processing of setting authentication information for a destination selected from the destination table, which is performed in step S3-005.

In step S8-001, the CPU 201 checks the destination type in the destination list 13, starting from the first destination (idx 1). If the destination type is the destination table (FILE IN DESTINATION TABLE in step S8-001), the processing proceeds to step S8-002, and if not (OTHERS in step S8-001), the processing proceeds to step S8-008.

In steps S8-002 and S8-003, the CPU 201 checks the setting of the authentication method for a destination selected from the destination table by referring to the authentication setting information stored in the HD 210. If the setting of displaying the each-time screen is selected for a destination from the destination table (YES in step S8-002), the processing proceeds to step S8-003, and if not (NO in step S8-002), the processing proceeds to step S8-007.

In step S8-003, the CPU 201 checks the setting about whether to inherit the authentication information used in the send authentication as the authentication method for a destination selected from the destination table, by referring to the authentication setting information. If the setting of inheriting the authentication information is selected for a destination from the destination table (YES in step S8-003), the processing proceeds to step S8-004, and if not (NO in step S8-003), the processing proceeds to step S8-006.

In step S8-004, the CPU 201 displays a screen prompting the user to enter a username and a password on the DISPLAY 208, and presets the username and the password stored in the context 5000 illustrated in FIG. 5 to the username and password input fields.

Figure 11A:
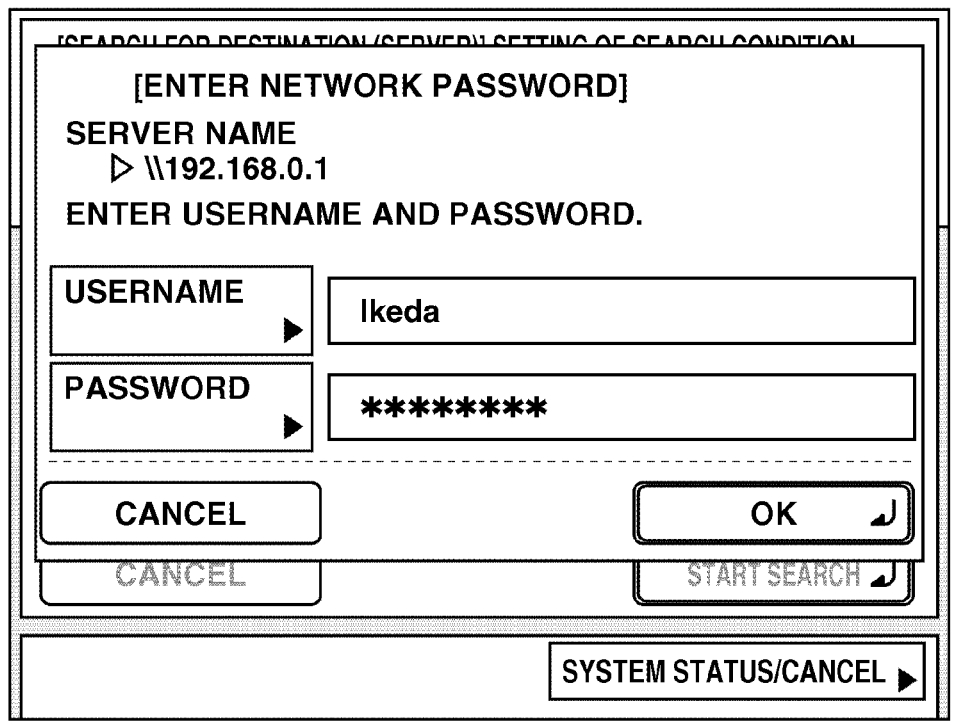
FIGS. 11A and 11B illustrate examples of a screen prompting a user to enter a username and a password for sending data to a destination selected from the destination table.

FIG. 11A illustrates an example of the screen displayed on the DISPLAY 208 in step S8-004. The username stored in the context 5000 is preset to the username field. Further, in the password field on the screen, the true password stored in context 5000 is replaced with dummy characters (for example, the character "*"), but actually, internal processing presets the true password in the context 5000.

Figure 11B:
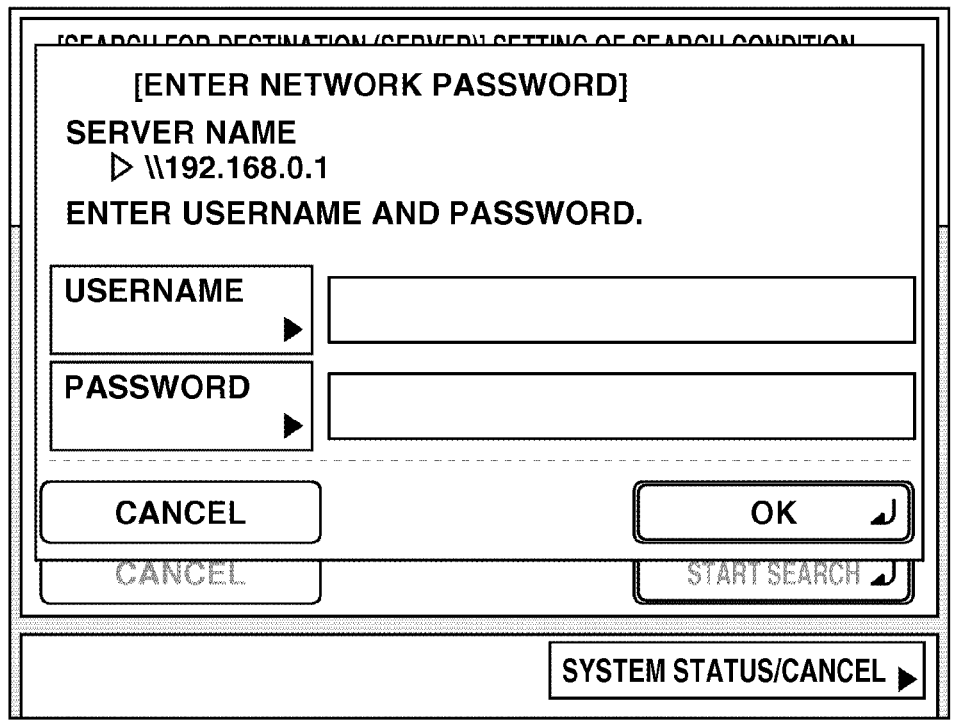

On the other hand, in step S8-006, the CPU 201 displays a screen prompting the user to enter authentication information such as a username and a password on the DISPLAY 208. In this case, since the authentication information is not inherited, the CPU 201 displays a screen containing blank "USERNAME" and "PASSWORD" input fields, as illustrated in FIG. 11B. In this case, the user has to enter data into the respective input fields through a manual operation.

In step S8-005, the CPU 201 receives the user's inputs and/or modifications of username and/or password. Then, when input completion is notified by pressing of the OK button illustrated in FIGS. 11A and 11B, the processing proceeds to step S8-008.

If the CPU determines in step S8-002 that the setting of not displaying the each-time screen is selected for a destination from the destination table (NO in step S8-002), the processing proceeds to step S8-007. In step S8-007, the CPU 201 does not display the screen as illustrated in FIGS. 11A and 11B, and uses the username and the password registered in the destination table without any modification. Then, the processing proceeds to step S8-008.

In step S8-008, the CPU 201 checks whether the currently processed destination is the last idx in the destination list. If the currently processed destination is the last idx in the destination list (YES in step S8-008), the present flowchart is ended. If not (NO in step S8-008), the idx is incremented by one, and the processing returns to S8-001.

FIG. 14 illustrates an example 14 of the destination list after completion of setting of the authentication information for the destinations in the destination table by the processing illustrated in the flowchart of FIG. 8 (immediately before the destination list is put in the send processing queue as a job). The usernames and passwords stored in the context 5000 are set to the usernames and passwords of idx1 and idx2 in FIG. 14. This example indicates that the setting of displaying the each-time screen is selected (YES in step S8-002) and the setting of inheriting the authentication information for the send authentication is selected (YES in step S8-003) for a destination from the destination table.

Figure 12:
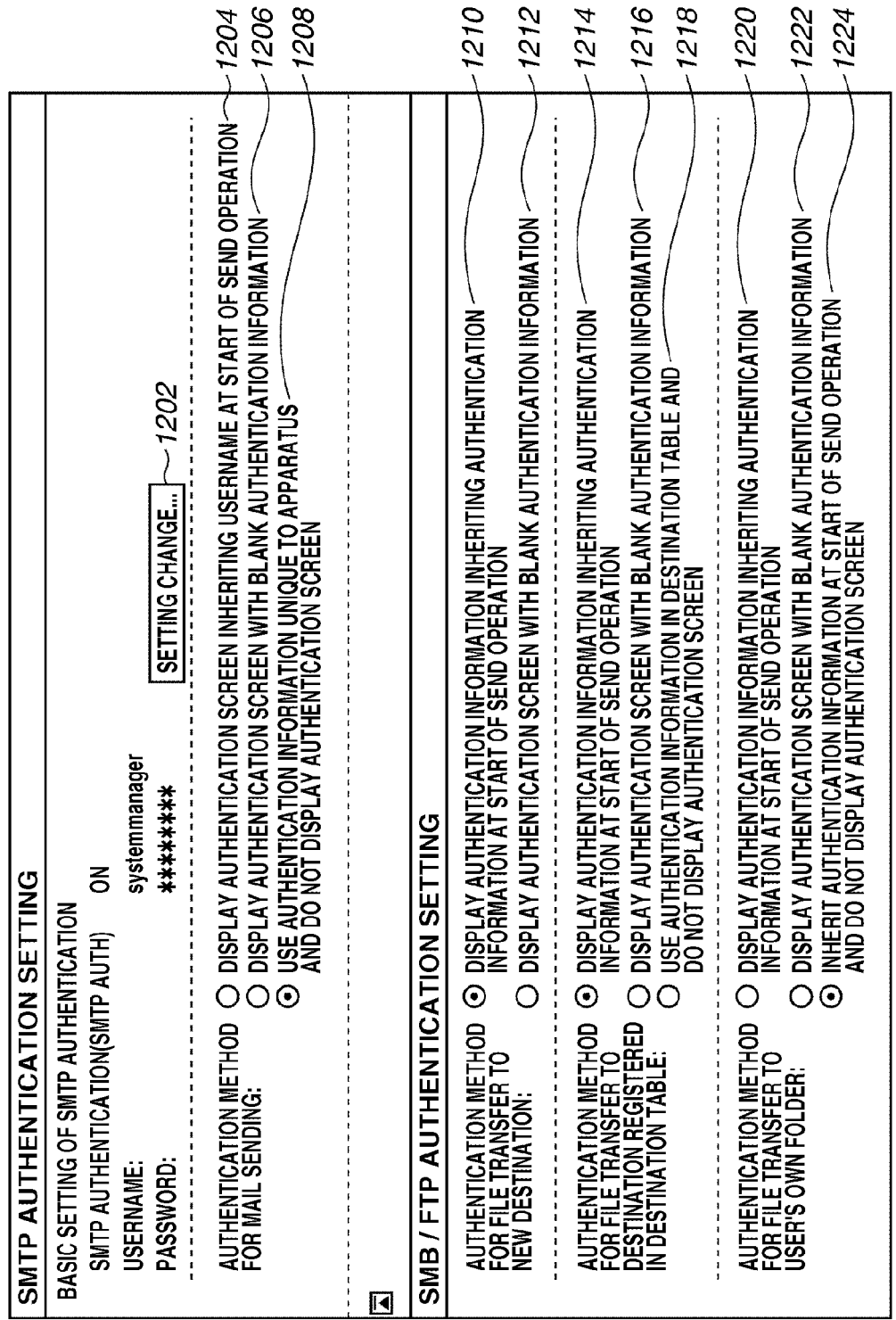
FIG. 12 illustrates an example of a setting screen for setting authentication setting information.

FIG. 12 illustrates an example of an authentication method setting screen to be displayed on the DISPLAY 208 so that a user or administrator can set the authentication setting information.

A SETTING CHANGE button 1202 is a button for selecting the settings required for SNIP authentication. When the SETTING CHANGE button 1202 is pressed, the DISPLAY 208 shows a not-illustrated screen for selecting detailed settings for SNIP authentication. This screen allows a user to enable/disable SNIP authentication, and set authentication information such as a username and a password if SMTP authentication is enabled.

Radio buttons 1204 to 1208 are buttons allowing selections about the authentication method when a user sends image data via an electric mail. The radio button 1204 is a button for a selection of inheriting the authentication information (context 5000) used in the send authentication, and presetting the authentication information used in the send authentication on the screen for inputting authentication information, when a user sends image data via an electric mail. The radio button 1206 is a button for a selection of not inheriting the authentication information used in the send authentication, and displaying blank fields for inputting authentication information on the screen for inputting the authentication information, when a user sends image data via an electric mail. The radio button 1208 is a button for a selection of using the authentication information unique to the apparatus, i.e., the username and the password for SMTP authentication set by pressing of the SETTING CHANGE button 1202, and not displaying a screen for inputting authentication information, when a user sends image data via an electric mail.

Radio buttons 1210 to 1224 are buttons allowing selections about the authentication methods when a user sends image data with use of the SMB protocol or the FTP protocol. There are prepared radio buttons for setting the authentication methods in such a manner that the authentication methods are associated with the destination setting methods when a user sends image data with use of the SMB protocol or the FTP protocol.

The radio button 1210 is a button for a selection of inheriting the authentication information (context 5000) used in the send authentication, and presetting the authentication information used in the send authentication on the screen for inputting authentication information, when the destination to which image data is sent is a new destination that is not selected from the destination table. The radio button 1212 is a button for a selection of not inheriting the authentication information used in the send authentication, and displaying blank fields for inputting authentication information on the screen for inputting the authentication information, when the destination to which image data is sent is a new destination.

The radio button 1214 is a button for a selection of inheriting the authentication information (context 5000) used in the send authentication, and presetting the authentication information used in the send authentication on the screen for inputting authentication information, when a user sends image data to a destination selected from the destination table. The radio button 1216 is a button for a selection of not inheriting the authentication information used in the send authentication, and displaying blank fields for inputting authentication information on the screen for inputting the authentication information, when a user sends image data to a destination selected from the destination table. The radio button 1218 is a button for a selection of using the authentication information registered in the destination table, and not displaying a screen for inputting authentication information, when a user sends image data to a destination selected from the destination table.

The radio button 1220 is a button for a selection of inheriting the authentication information (context 5000) used in the send authentication, and presetting the authentication information used in the send authentication on the screen for inputting authentication information, when a user sends image data to the user's own folder. The radio button 1222 is a button for a selection of not inheriting the authentication information used in the send authentication, and displaying blank fields for inputting authentication information on the screen for inputting the authentication information, when a user sends image data to the user's own folder. The radio button 1224 is a button for a selection of using the authentication information (context 5000) used in the send authentication, and not displaying the screen for inputting authentication information, when a user sends image data to the user's own folder. In this way, the MFP 200 is configured so as to enable a user to set a desired authentication method for each of the send protocols that the MFP 200 supports (SMTP, SMB/FTP in the present exemplary embodiment), and further, for each of the destination selection methods. The selections set on the screen illustrated in FIG. 12 are stored in the HD 210 as the authentication setting information by pressing of a not-illustrated OK button.

The authentication setting information set on the setting screen illustrated in FIG. 12 and stored in the HD 210 is referred to when the CPU 201 makes a determination in step S6-001 in FIG. 6, steps S7-001 and S7-002 in FIG. 7, and steps S8-002 and S8-003 in FIG. 8. The radio buttons grouped by "new destination", "destination table", and "send data to user's own folder" are controlled in such a manner that only one button can be selected for each group.

According to the present exemplary embodiment as mentioned above, the MFP 200 enables a user to arbitrarily switch whether to inherit the authentication information and whether to display the authentication screen according to a kind of selected destination and a selected destination setting method.

The present exemplary embodiment has been described, focusing on the send authentication by the LDAP server 300 as one example of the function authentication. However, the present exemplary embodiment is not limited to the function authentication. For example, the authentication information used in the device authentication may be used as the above-mentioned context 5000. Further, the send authentication may be performed by the MFP 200, instead of the LDAP server 300. For example, such a configuration can be realized by storing a table containing usernames and passwords in the HD 210 of the MFP 200, and checking a username and a password entered on an authentication screen against this table.

Further, the present exemplary embodiment is configured in such a manner that the each-time processing and the inheritance processing for a file destination in the destination table is performed after establishment of a destination selection. However, the each-time processing and the inheritance processing may not be performed after destination establishment. For example, steps S8-001 and S8-008 may be removed from the processing illustrated in FIG. 8 and the each-time processing and the inheritance processing may be performed before step S4-005 in FIG. 4. By this modification, the same effects can be achieved even if the destination list illustrated in FIGS. 13 and 14 does not contain the item of destination type. On the contrary, the each-time processing and the inheritance processing for "send data to user's own folder" illustrated in FIG. 7 may be performed at the same timing as the timing of the each-time processing and the inheritance processing for a file destination in the destination table in the first exemplary embodiment, and this modification can provide the same effects as the effects of the first exemplary embodiment. In this case, however, the processing illustrated in FIG. 7 should additionally have a step similar to step S8-001 (step of determining whether the destination is "send data to user's own folder"), and a step corresponding to step S8-008.

Further, as illustrated in FIG. 12, the present exemplary embodiment is configured in such a manner that the authentication method can be selected for each of the three destination setting methods, i.e., "new destination", "destination table", and "send data to user's own folder". However, for example, if the MFP 200 is provided with the function enabling a selection of a destination from the past send history, or enabling a selection of a destination from a routine work registered in advance, the MFP 200 may be configured in such a manner that the authentication method can be also set for each of those destination setting methods. As a result, it is possible to offer more flexible combinations of "each-time" and "inheritance" to a user.

Further, in the first exemplary embodiment, "each-time" and "inheritance" is applied to the authentication to access a folder in a file transfer. However, "each-time" and "inheritance" may be applied to another authentication that is not folder authentication. For example, "each-time" and "inheritance" can be applied to SNIP authentication for sending an electronic mail. More specifically, the same effects can be obtained by individually setting "each-time" and "inheritance" to SNIP authentication in normal electric mail sending in which a user selects a destination, and to SNIP authentication when a send result is notified to a specific destination by an electric mail. Further, "each-time" and "inheritance" about SMTP authentication may be switched according to electronic mail or I-Fax.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-101303 filed Apr. 26, 2010, which is hereby incorporated by reference herein in its entirety.

What is claimed is:

1. An image sending apparatus comprising:
one or more memory devices storing instructions for execution by one or more processors; and
the one or more processors, operable when executing the instructions to:
receive a password;
perform processing for first authentication using the password to allow a user to set a sending method from among a plurality of different sending methods for sending image data;
store the password in response to a result of the first authentication being an authentication success result;
set a sending method for sending the image data to a destination based on a user instruction;
determine, based on setting information associated with the set sending method for sending the image data to the destination, whether to use the stored password as a password for second authentication required to send the image data to the destination; and
perform processing for the second authentication, wherein, in response to determining to use the stored password as the password for the second authentication, the processing for the second authentication is performed with use of the stored password, and, in response to determining not to use the stored password as the password for the second authentication, the processing for the second authentication is performed without use of the stored password.

2. The image sending apparatus according to claim 1, wherein the destination is set by one of a plurality of different setting methods, and
wherein the determining whether to use the stored password as the password for the second authentication is further based on the setting method by which the destination is set.

3. The image sending apparatus according to claim 2, wherein the plurality of different setting methods include at least any of the following setting methods:

(1) selecting a destination to which the image data is to be sent from a destination table stored at a storage unit;
(2) setting a destination that is not stored in the destination table, by an operation of the user; and
(3) setting a destination associated with the user identified from an authentication result of the first authentication, the result of the first authentication being the authentication success result.

4. The image sending apparatus according to claim 1, wherein the one or more processors are further operable when executing the instructions to:
issue a notification to the user to prompt the user to enter a password required for the second authentication in response to determining not to use the stored password as the password for the second authentication.

5. The image sending apparatus according to claim 1, wherein the plurality of different sending methods include any of an electronic mail, a file transfer with use of the SMB protocol, and a file transfer with use of the FTP protocol.

6. The image sending apparatus according to claim 1, wherein the setting information associated with the set sending method includes information specifying an authentication method to be applied to the second authentication, and
wherein the determining whether to use the stored password as the password for the second authentication comprises identifying the authentication method by referring to the setting information, and determining, in accordance with the identified authentication method, whether to use the stored password as the password for the second authentication.

7. A method in an image sending apparatus, the method comprising:
receiving a password;
performing processing for first authentication using the password to allow a user to set a sending method from among a plurality of different sending methods for sending image data;
storing the password in response to a result of the first authentication being an authentication success result;
setting a sending method for sending the image data to a destination based on a user instruction;
determining, based on setting information associated with the set sending method for sending the image data to the destination, whether to use the stored password as a password for second authentication required to send the image data to the destination; and
performing processing for the second authentication, wherein, in response to determining to use the stored password as the password for the second authentication, the processing for the second authentication is performed with use of the stored password, and, in response to determining not to use the stored password as the password for the second authentication, the processing for the second authentication is performed without use of the stored password.

8. The method according to claim 7, wherein the destination is set by one of a plurality of different setting methods, and
wherein the determining whether to use the stored password as the password for the second authentication is further based on the setting method by which the destination is set.

9. The method according to claim 8, wherein the plurality of different setting methods include at least any of the following setting methods:
(1) selecting a destination to which the image data is to be sent from a destination table stored at a storage unit;
(2) setting a destination that is not stored in the destination table, by an operation of the user; and
(3) setting a destination associated with the user identified from an authentication result of the first authentication, the result of the first authentication being the authentication success result.

10. The method according to claim 7, further comprising:
issuing a notification to the user to prompt the user to enter a password required for the second authentication in response to determining not to use the stored password as the password for the second authentication.

11. The method according to claim 7, wherein the plurality of different sending methods include any of an electronic mail, a file transfer with use of the SMB protocol, and a file transfer with use of the FTP protocol.

12. The method according to claim 7, wherein the setting information associated with the set sending method includes information specifying an authentication method to be applied to the second authentication, and
wherein the determining whether to use the stored password as the password for the second authentication comprises identifying the authentication method by referring to the setting information, and determining, in accordance with the identified authentication method, whether to use the stored password as the password for the second authentication.

13. A non-transitory computer-readable storage medium storing instructions that, when executed by one or more processors of an image sending apparatus, cause the one or more processors to perform operations comprising:
receiving a password;
performing processing for first authentication using the password to allow a user to set a sending method from among a plurality of different sending methods for sending image data;
storing the password in response to a result of the first authentication being an authentication success result;
setting a sending method for sending the image data to a destination based on a user instruction;
determining, based on setting information associated with the set sending method for sending the image data to the destination, whether to use the stored password as a password for second authentication required to send the image data to the destination; and
performing processing for the second authentication, wherein, in response to determining to use the stored password as the password for the second authentication, the processing for the second authentication is performed with use of the stored password, and, in response to determining not to use the stored password as the password for the second authentication, the processing for the second authentication is performed without use of the stored password.

14. The non-transitory computer-readable storage medium according to claim 13, wherein the destination is set by one of a plurality of different setting methods, and
wherein the determining whether to use the stored password as the password for the second authentication is further based on the setting method by which the destination is set.

15. The non-transitory computer-readable storage medium according to claim 14, wherein the plurality of different setting methods include at least any of the following setting methods:
(1) selecting a destination to which the image data is to be sent from a destination table stored at a storage unit;

(2) setting a destination that is not stored in the destination table, by an operation of the user; and (3) setting a destination associated with the user identified from an authentication result of the first authentication, the result of the first authentication being the authentication success result.

16. The non-transitory computer-readable storage medium according to claim 13, the operations further comprising:
issuing a notification to the user to prompt the user to enter a password required for the second authentication in response to determining not to use the stored password as the password for the second authentication.

17. The non-transitory computer-readable storage medium according to claim 13, wherein the plurality of different sending methods include any of an electronic mail, a file transfer with use of the SMB protocol, and a file transfer with use of the FTP protocol.

18. The non-transitory computer-readable storage medium according to claim 13, wherein the setting information associated with the set sending method includes information specifying an authentication method to be applied to the second authentication, and
wherein the determining whether to use the stored password as the password for the second authentication comprises identifying the authentication method by referring to the setting information, and determining, in accordance with the identified authentication method, whether to use the stored password as the password for the second authentication.

\* \* \* \* \*